(12) United States Patent
Muck (10) Patent No.: US 12,117,241 B2
(45) Date of Patent: Oct. 15, 2024

(54) FURNACE

(71) Applicant: ONEJOON GMBH, Bovenden (DE)

(72) Inventor: Matthias Muck, Adelebsen (DE)

(73) Assignee: ONEJOON, GMBH, Bovenden (DE)

(*) Notice: Subject to any disclaimer, the term of this patent is extended or adjusted under 35 U.S.C. 154(b) by 0 days.

(21) Appl. No.: 17/046,343

(22) PCT Filed: Mar. 29, 2019

(86) PCT No.: PCT/EP2019/057981
§ 371 (c)(1),
(2) Date: Oct. 9, 2020

(87) PCT Pub. No.: WO2019/197176
PCT Pub. Date: Oct. 17, 2019

(65) Prior Publication Data
US 2021/0048249 A1    Feb. 18, 2021

(30) Foreign Application Priority Data

Apr. 9, 2018  (DE) ...................... 10 2018 108 291.6

(51) Int. Cl.
*F27B 9/10*   (2006.01)
*D01F 9/32*   (2006.01)
(Continued)

(52) U.S. Cl.
CPC ................ *F27B 9/10* (2013.01); *D01F 9/328* (2013.01); *F27B 9/28* (2013.01); *C09C 1/48* (2013.01);
(Continued)

(58) Field of Classification Search
CPC .... F27B 9/10; F27B 9/28; F27B 9/082; F27B 9/34; F27B 9/36; D01F 9/328; D01F 9/32;
(Continued)

(56) References Cited

U.S. PATENT DOCUMENTS 1,289,890 A * 12/1918 Owens ...................... F27B 9/10
                                                      432/152
2,254,964 A *  9/1941 Kettlewell .............. F16L 59/12
                                                      138/149
(Continued)

FOREIGN PATENT DOCUMENTS

CN      106 521 711 A      3/2017
DE       20 34 597 A      1/1972
(Continued)

OTHER PUBLICATIONS

Office Action in related RU application No. 100, 181 dated Sep. 19, 2022, 14 pages.

*Primary Examiner* — Steven B McAllister
*Assistant Examiner* — Benjamin W Johnson
(74) *Attorney, Agent, or Firm* — SCHROEDER INTELLECTUAL PROPERTY LAW GROUP, LLC (57) ABSTRACT

A furnace for the thermal treatment, particularly for carbonization and/or graphitization, of material, particularly of fibers, particularly of fibers made from oxidized polyacrylonitrile (PAN), the furnace having a furnace housing and a process chamber located in the interior chamber of the furnace housing, which is delimited by a process chamber housing and into which the material to be treated can be introduced. A process chamber atmosphere prevailing in the process chamber can be heated by means of a heating system. An insulation layer thermally insulates the process chamber. The insulation layer is an insulation fill made from a solid particulate material.

19 Claims, 5 Drawing Sheets

(51) Int. Cl.
*F27B 9/28* (2006.01)
*C09C 1/48* (2006.01)
*D01F 9/22* (2006.01)
*F27B 9/08* (2006.01)
*F27B 9/34* (2006.01)
*F27B 9/36* (2006.01)

(52) U.S. Cl.
CPC ............... *D01F 9/22* (2013.01); *F27B 9/082* (2013.01); *F27B 9/34* (2013.01); *F27B 9/36* (2013.01); *F28F 2270/00* (2013.01)

(58) Field of Classification Search
CPC ...... D01F 9/22; F28F 2270/00; F27D 1/0009; B32B 18/00; C09C 1/48
USPC ......................................................... 432/121
See application file for complete search history.

(56) References Cited

U.S. PATENT DOCUMENTS

| | | | | |
|---|---|---|---|---|
| 4,321,446 A | * | 3/1982 | Ogawa | C01B 32/05 219/645 |
| 4,681,536 A | * | 7/1987 | Jansen | C21D 9/565 432/59 |
| 4,820,905 A | * | 4/1989 | Iwata | D01F 9/32 219/390 |
| 4,900,247 A | * | 2/1990 | Takahashi | F27B 9/34 432/59 |
| 5,227,175 A | * | 7/1993 | Reinbold | F27B 9/029 28/240 |
| 5,879,462 A | * | 3/1999 | Kordina | C30B 29/38 118/725 |
| 6,413,601 B1 | * | 7/2002 | Blain | B32B 18/00 264/28 |
| 2001/0033035 A1 | * | 10/2001 | Panter | D01F 9/22 264/29.7 |
| 2003/0189965 A1 | | 10/2003 | Miller et al. | |
| 2006/0029897 A1 | * | 2/2006 | Saijo | F27B 9/10 432/121 |
| 2007/0043157 A1 | * | 2/2007 | Riebel | C09C 1/48 422/150 |
| 2011/0136069 A1 | * | 6/2011 | Ryoki | F27B 9/10 432/128 |
| 2016/0040322 A1 | * | 2/2016 | Hatayama | F27D 7/04 264/29.2 |
| 2016/0209115 A1 | * | 7/2016 | Berner | D01F 9/32 |
| 2017/0073846 A1 | * | 3/2017 | Decker | D01F 9/32 |
| 2020/0181809 A1 | * | 6/2020 | Muck | D01F 9/32 |

FOREIGN PATENT DOCUMENTS

| | | | | |
|---|---|---|---|---|
| DE | 20 2017 107 588 U1 | 1/2018 | | |
| EP | 0252506 A2 | * 1/1988 | ............... | D01F 9/32 |
| JP | S56-43423 A | 4/1981 | | |
| JP | 02175923 A | * 7/1990 | | |
| JP | H02-175923 | 7/1990 | | |
| JP | H02175923 A | * 7/1990 | ............... | D01F 9/32 |
| JP | H04-163321 A | 6/1992 | | |
| JP | 2001-240472 A | 9/2001 | | |
| JP | 2004-99355 A | 4/2004 | | |
| JP | 2004-205068 A | 7/2004 | | |
| JP | 2008-082611 A | 4/2008 | | |
| RU | 94 04 5989 | 8/1996 | | |
| SU | 672 218 | 7/1979 | | |
| WO | 93/19927 | 10/1993 | | |

\* cited by examiner

FURNACE

RELATED APPLICATIONS

This application is a § 371 national phase of International Patent Application No. PCT/EP2019/057981 filed Mar. 29, 2019, which claims the filing benefit of German Patent Application No. 10 2018 108 291.6 filed Apr. 9, 2018, the contents of both of which are incorporated herein by reference.

FIELD OF THE INVENTION

The invention relates to a furnace for the thermal treatment, in particular the carbonization and/or graphitization, of material, in particular of fibers, in particular of fibers composed of oxidized polyacrylonitrile PAN, comprising
  a) a furnace housing;
  b) a process space which is located in the interior space of the furnace housing and is delimited by a process space housing and into which the material to be treated can be introduced;
  c) a heating system by means of which a process space atmosphere present in the process space can be heated;
  d) an insulation layer which thermally insulates the process space.

BACKGROUND OF THE INVENTION

Such furnaces are used, in particular, in the production of carbon fibers which are formed from fibers composed of polyacrylonitrile in a three- or four-stage process. Polyacrylonitrile will hereinafter mostly be abbreviated to PAN. Felts and nonwovens and carbon fiber papers can also be treated in such furnaces. Materials other than PAN are, for example, viscose and lignin.

In a first production stage, polyacrylonitrile is oxidized at temperatures in the range from about 200° C. to 400° C. in the presence of oxygen in an oxidation furnace to form oxidized PAN fibers.

These oxidized PAN fibers are then subjected, in a second production stage, to a thermal treatment in an oxygen-free inert gas atmosphere in a furnace at about 400° C. to 1000° C. in order to increase the proportion of carbon in the fibers by means of carbonization, which proportion in the oxidized PAN fibers is about 62% by weight. Nitrogen $N_2$ is generally used as inert gas.

In a third production stage, thermal treatment is carried out in a furnace of the abovementioned type, which is referred to as a high-temperature furnace, at a temperature from 800° C. to 1800° C. under a nitrogen atmosphere, resulting in a carbonization in which the PAN fibers pyrolyze until they have a carbon content from about 92% by weight to 95% by weight.

The carbon fibers obtained after the third production stage are optionally subjected to a further thermal treatment in an oxygen-free inert gas atmosphere at temperatures in the range from 1800° C. to 3000° C. in a fourth production stage in a furnace of the abovementioned type; these temperatures result in graphitization of the carbon fibers which then have a carbon content of more than 99% by weight and are referred to as graphite fibers. In general, argon Ar is used as inert gas during graphitization.

In known high-temperature furnaces, the process space is delimited by a muffle which is composed of graphite and is surrounded by a heating space in which a heating cage surrounding the muffle or merely one heating element is accommodated above and below the muffle. The insulation layer which thermally insulates the process space and there surrounds the heating space and is usually made of hard or soft graphite felts, sometimes in combination with ceramic fibers, which are arranged appropriately between the furnace housing and the heating space. However, such insulation materials have comparatively poor insulating properties and, in particular, display quite high thermal conductivities in the abovementioned high temperature ranges. Heat losses and a consequent energy consumption for maintaining the furnace temperature therefore occur.

There are also furnaces of the abovementioned type in which the furnace is water-cooled. In this case, the insulation layer which thermally insulates the process space is formed by a layer of liquid. This insulation concept is, however, both structurally and energetically very demanding.

SUMMARY OF THE INVENTION

It is an object of the invention to provide a furnace of the abovementioned type which can be carried out in an energy-efficient manner.

A furnace which achieves this object is characterized in that
  e) the insulation layer is an insulating bed composed of a solid particulate material.

According to the invention, it has been recognized that a solid particulate material can have a high thermally insulating effect which exceeds that of the known insulation concepts, with, in particular, the structural complexity being low compared to water-cooled systems. The solid particulate material is preferably free-flowing bulk material.

It is advantageous for the solid particulate material of the insulating bed to be densified; in this way, the insulating effect can be increased compared to an undensified bed of the solid particulate material.

The solid particulate material is preferably a granular material, in particular in the form of a grain-like material, a pulverulent material or a powder material, or has been processed to give a pellet material.

A particularly good insulating effect can be achieved when the solid particulate material is a carbon black material, in particular a carbon black material having a carbon content of more than 99.5%.

In practice, the carbon black material can advantageously be a gas black, a furnace black, a flame black, a carbon black from cracking, an acetylene black, a thermal black, a channel black or a mixture of a plurality of these types of carbon black.

The insulating bed is preferably located in an insulation space which surrounds the process space housing at least in regions.

The insulation space can preferably be configured as an annular space whose outer boundary is formed by corresponding regions of the furnace housing.

It is advantageous for the insulation space to adjoin the process space housing at least in regions. In the places where the insulation space adjoins the process space housing, there is no intermediate space between the insulation layer and the process space housing.

To heat the process space atmosphere, it is advantageous for the heating system to comprise at least one heating element which is arranged in the process space. When only this heating concept is implemented, it is, for example, possible for the insulation space to surround the process space housing completely in the circumferential direction and adjoin the process space housing.

As an alternative or in addition, it can be advantageous for the heating system to comprise at least one heating element which is arranged in a heating space which adjoins the process space housing. In this case, the insulation layer itself cannot adjoin the process space housing in the places where the heated space adjoins the process space housing.

The heating space is preferably arranged on the upper side or on the underside of the process space housing. However, alternative or supplementary variants, in which the heating space and consequently also the heating element accommodated therein are provided on the side of the process space housing, are also possible.

A particularly effective variant is obtained when the heating element is a first heating element and the heating space is a first heating space, where the heating system comprises at least one second heating element which is arranged in a second heating space which adjoins the process space.

Preference is given to the first heating space being arranged on the upper side and the second heating space being arranged on the underside of the process space housing.

It is advantageous for the process space housing to be configured as a muffle, in particular a muffle composed of graphite.

When one or more heating spaces are present, it is advantageous for the process space housing to delimit the process space and the one or more heating spaces.

The furnace can be configured as batch furnace having a single entrance via which the material to be treated can be introduced into the process space and taken out again from the process space. However, it is advantageous for the furnace to be a continuous furnace and the material to be treated to be able to be passed through the process space. This is particularly advantageous when fibers as mentioned at the outset are to be treated.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Working examples of the invention are described in more detail below with the aid of the drawings. The drawings show.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

The figures show the furnace 10 for the thermal treatment of material, in which the working examples shown in FIGS. 1 to 5 relate to fibers 12 and by way of example fibers 14 composed of oxidized polyacrylonitrile, which will hereinafter be referred to as oxPAN fibers 14.

The furnace 10 comprises a furnace housing 16 which delimits an interior space 18. The furnace housing 16 is made of steel in the working examples described. The furnace housing 16 has a fiber entry passage 20, which can be seen only in FIG. 2, at one end face and a fiber exit passage, which owing to the view shown cannot be discerned in the figures, at an opposite end face. Apart from these passages, the furnace housing 16 is gastight.

In the interior space 18 of the furnace housing 16 there is a process space 22 which is in turn delimited by a process space housing 24 in the form of a muffle 26. The process space housing 24 has a rectangular cross section, but other, for example curved or round, cross sections are also possible. In the present working example, the muffle 26 is made of graphite. The process space housing 24, i.e. the muffle 26, has a fiber inlet opening 28, which can again be seen only in FIG. 2, at one end face and a fiber outlet opening, which can likewise not be discerned in the figures, at an opposite end face. During operation of the furnace 10, a process space atmosphere 30 is present in the process space 22.

Figure 1:
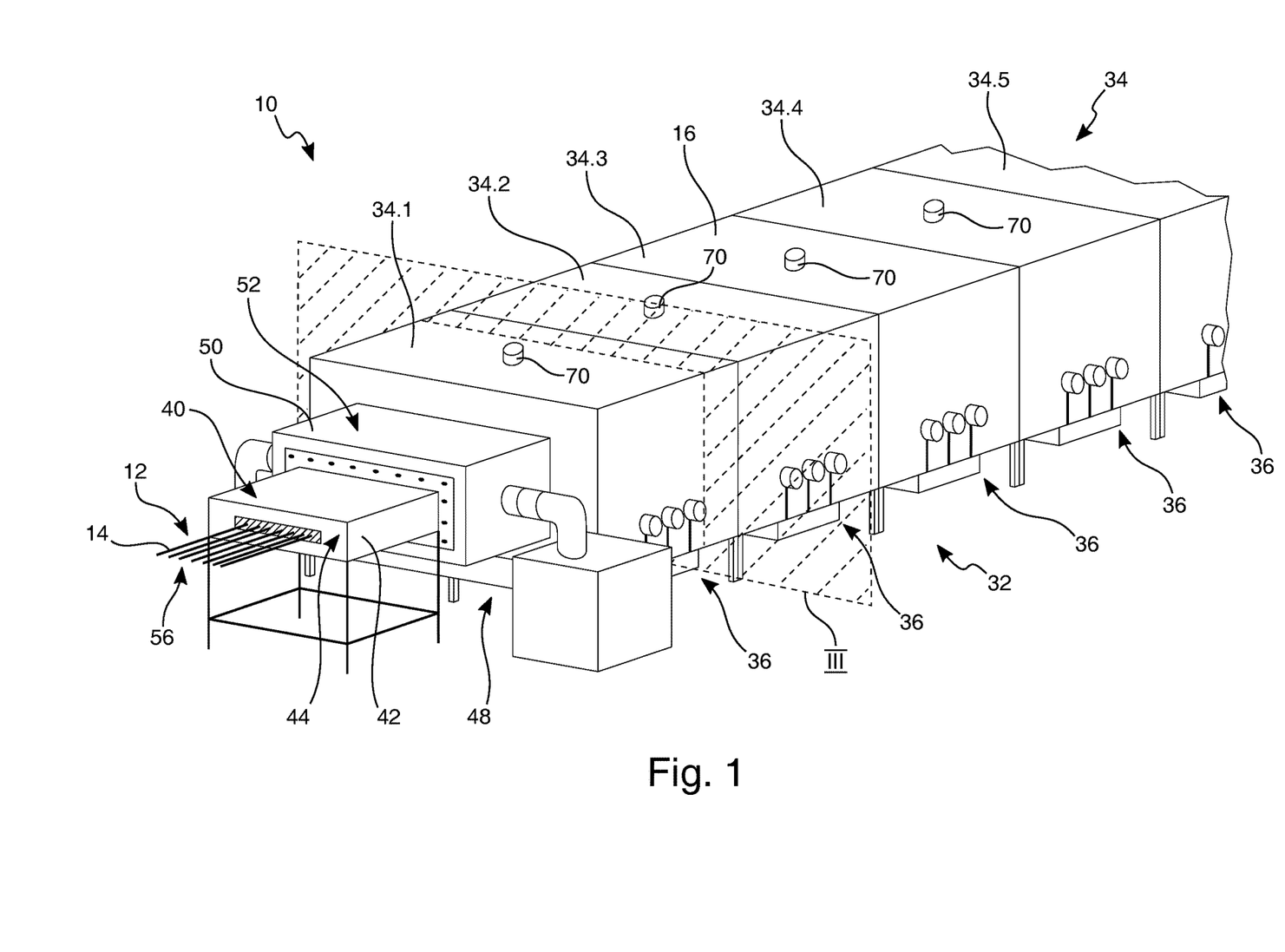
FIG. 1 a perspective view of a furnace for the thermal treatment of carbon fibers.

The furnace 10 comprises a heating system 32 by means of which the process space atmosphere 30 is heated. Successive heating zones 34, of which five heating zones 34.1, 34.2, 34.3, 34.4 and 34.5 can be discerned in FIG. 1, are formed in the process space 22 between the fiber inlet opening 22 and the fiber outlet opening of the muffle 26. The temperature rises from heating zone to heating zone in such a way that a temperature gradient from about 800° C. to about 1800° C. is present in the process space 22. Each heating zone 34 is assigned a dedicated heating device 36 which heats the muffle 26 in the associated heating zone 34 appropriately, as is known per se. The furnace 10 comprises an insulation layer 38 which thermally insulates the process space 22.

The heating devices 36 and the insulation layer 38 will be discussed in more detail in connection with FIGS. 3 to 5.

At the entry end, the furnace 10 has an intake lock 40 having a separate lock housing 42 and an exit lock, which can likewise not be discerned because of the view shown, likewise having a separate lock housing. An inert gas 46 is fed via the outer lock which cannot be seen into the interior space 18 of the furnace housing 16 and thus also into the process space 22 with the aid of an inert gas apparatus 44, so that the thermal treatment of the oxPAN fibers 14 proceeds under an inert gas atmosphere. As mentioned at the outset, nitrogen $N_2$ or argon Ar are in practice used as inert gas at temperatures above 1800° C. The process space atmosphere 30 is a mixture of the inert gas and a pyrolysis gas liberated in the treatment of the oxPAN fibers 14.

The furnace 10 additionally comprises an extraction system denoted overall by 48 by means of which the process space atmosphere 30 can be drawn off from the process space 22. In the present working example, a through-housing 50 of an extraction device 52 of the extraction system 48, which delimits a flow space 54, can be seen between the entry lock 40 and the furnace housing 16. This flow space 54 is connected in a gastight manner with the entry lock 40 at one end and connected in a gastight manner with the furnace housing 16 at the other end, so that the inert gas 46 can flow in from the entry lock 40 through the flow space 54 into the process space 22.

The oxPAN fibers 14 are conveyed by means of a transport system known per se, which is not individually shown, as fiber cartridge 56 through the entry lock 40, through the flow space 54 and further through the fiber entry passage 20 of the furnace housing 16 into the interior space 18 thereof and there through the fiber inlet opening 26 of the process space housing 24 into the process space 22. The fiber carpet 56 flows through the process space 22 and the heating zones 34 established there and is then conveyed out through the fiber outlet opening of the process space housing 24 and through the fiber exit passage of the furnace housing 16 and finally through the exit lock connected thereto out from the furnace 10.

The furnace 10 is consequently designed as continuous furnace. For materials other than fibers 12, the furnace can, in a modification which is not individually shown, also be constructed as batch furnace. In this case, the material is both introduced into the process space 22 and taken from the latter when the treatment is concluded via the passages shown.

The insulation layer 38 mentioned above is an insulating bed 58 composed of a solid particulate material 60. In practice, the solid particulate material is free-flowing bulk material.

The insulating bed 58 is located in an insulation space 62 which surrounds the process space housing 24 at least in regions. In the working example shown, the insulation space 62 adjoins the process space housing 24 at least in regions.

In the working example shown, the insulation space 62 is configured as an annular space 64 whose outer boundary is formed by corresponding regions 66 of the furnace housing 16. In the direction of the entry lock 40 and the exit lock, the annular space 64 is closed in each case by a circular wall 68, of which the corresponding circular wall 68 can be discerned in FIG. 2.

The insulating bed 58 is firstly introduced into the insulation space 62 with the detached housing lid, which is not individually labelled, and densified by means of rammers. It is also possible to densify the insulating bed 58 by means of vibration. For this purpose, parts of the furnace housing 16 can be vibrated at times from the outside. As an alternative, vibration generators can also be introduced into the insulating bed 58.

Over the course of time, the insulating bed 58 densifies as a result of the operation-related temperature change on heating up and cooling. In addition, shrinkage of material by reactions with the atmosphere is possible. This occurs particularly at relatively high temperatures above 1800° C.

To be able to compensate for such densification or such material shrinkage, the furnace housing 16 has closable entrance openings 70, for example in the form of entry ports as are illustrated only in FIG. 1. The insulation space 62 can be divided by intermediate walls into insulation sections which can then be accessed via a respective entrance opening 70. For example, each heating zone 34 can be assigned such an insulation section.

Solid particulate materials 60 supplemented in this way can also be densified by means of rammers and/or by means of vibration, as has been described above.

The solid particulate material 60 can be a granular material, in particular in the form of a grain-like material, a pulverulent material or a powder material. As an alternative, the solid particulate material can also have been processed to give a pellet material. A particularly good thermal insulation effect, i.e. poor thermal conductivity, is obtained in the case of carbon black material, in particular in the case of carbon black material having a carbon content of more than 99.5%, which is preferably a gas black, a furnace black, a flame black, a carbon black from cracking, an acetylene black, a thermal black, a channel black or a mixture of a plurality of these types of carbon black.

In all the working examples shown in FIGS. 2 to 5, the process space housing 24, i.e. the muffle 26, is mounted on struts 72 which extend downward through the insulation space 62 and are anchored on the bottom of the furnace housing 16. An entry-end and discharge-end fastening of the process space housing 24 on the furnace housing 16 may be sufficient; in this case, the struts 72 can be omitted.

Figure 2:
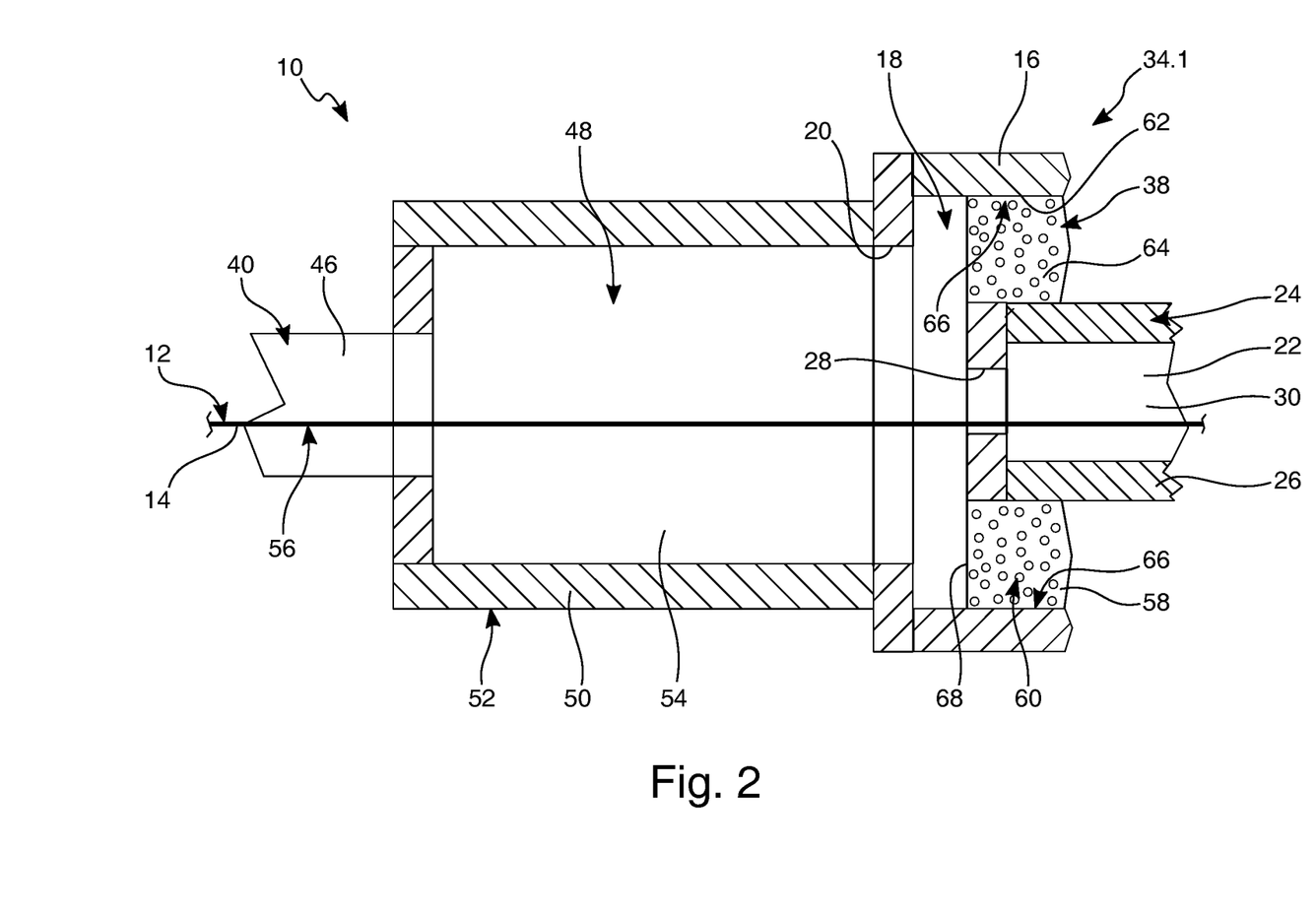
FIG. 2 a longitudinal section of the intake section of a first working example of the furnace as per FIG. 1.
Figure 3:
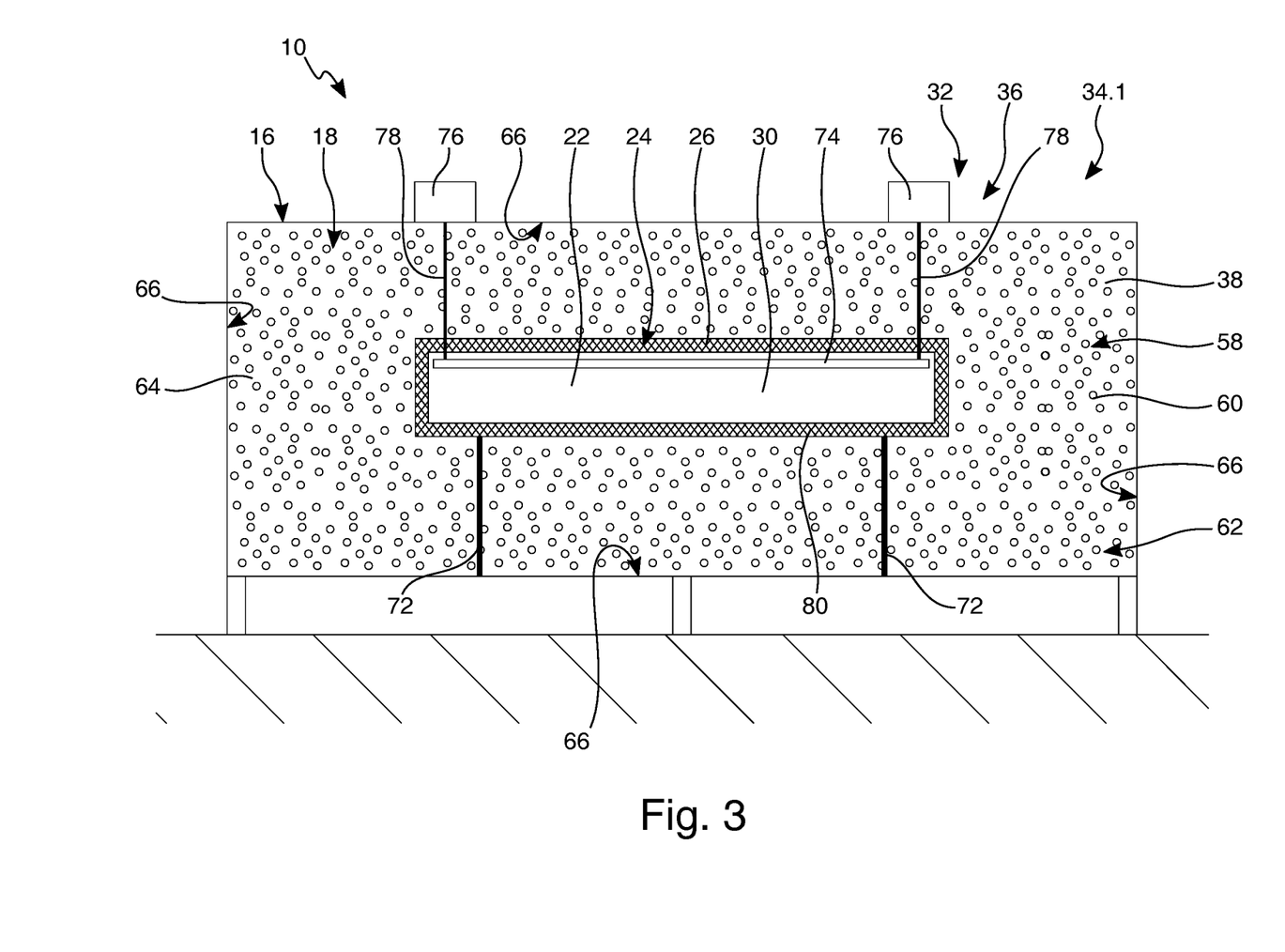
FIG. 3 a cross section of this first working example of the furnace as per FIG. 1 in the sectional plane III shown there.

FIGS. 2 and 3 show a first working example of the furnace 10, in which the insulation space 62 completely surrounds the process space housing 24 in the circumferential direction and completely adjoins the process space housing 24 in the circumferential direction. This can be seen in FIG. 3. In this case, the insulation space 62 for the insulating bed 58 is thus delimited in the circumferential direction on one side by the abovementioned region 66 of the furnace housing 16 and on the other side by the process space housing 24, i.e. the muffle 26.

The heating device 36 comprises a heating element 74, which is arranged in the process space 22, for each heating zone 34. The heating element 74 is plate-shaped in the present working example. Possible materials for the heating element 74 are, for example, graphite or composite materials in the form of carbon fiber carbon composite (CFC). The heating elements 74 are operated in a manner known per se by means of heating modules which are present on the outside on the furnace housing 16 and are not shown individually and are connected via connecting heads 76 and electrical connecting pins 78 to the heating elements 74, where the connecting pins 78 extend through the process space housing 24, the insulation space 62 and the furnace housing 16.

In the working example shown in FIGS. 2 and 3, the process space housing 24 is configured as a single-chain housing 80 which as such delimits only the process space 22.

Figure 4:
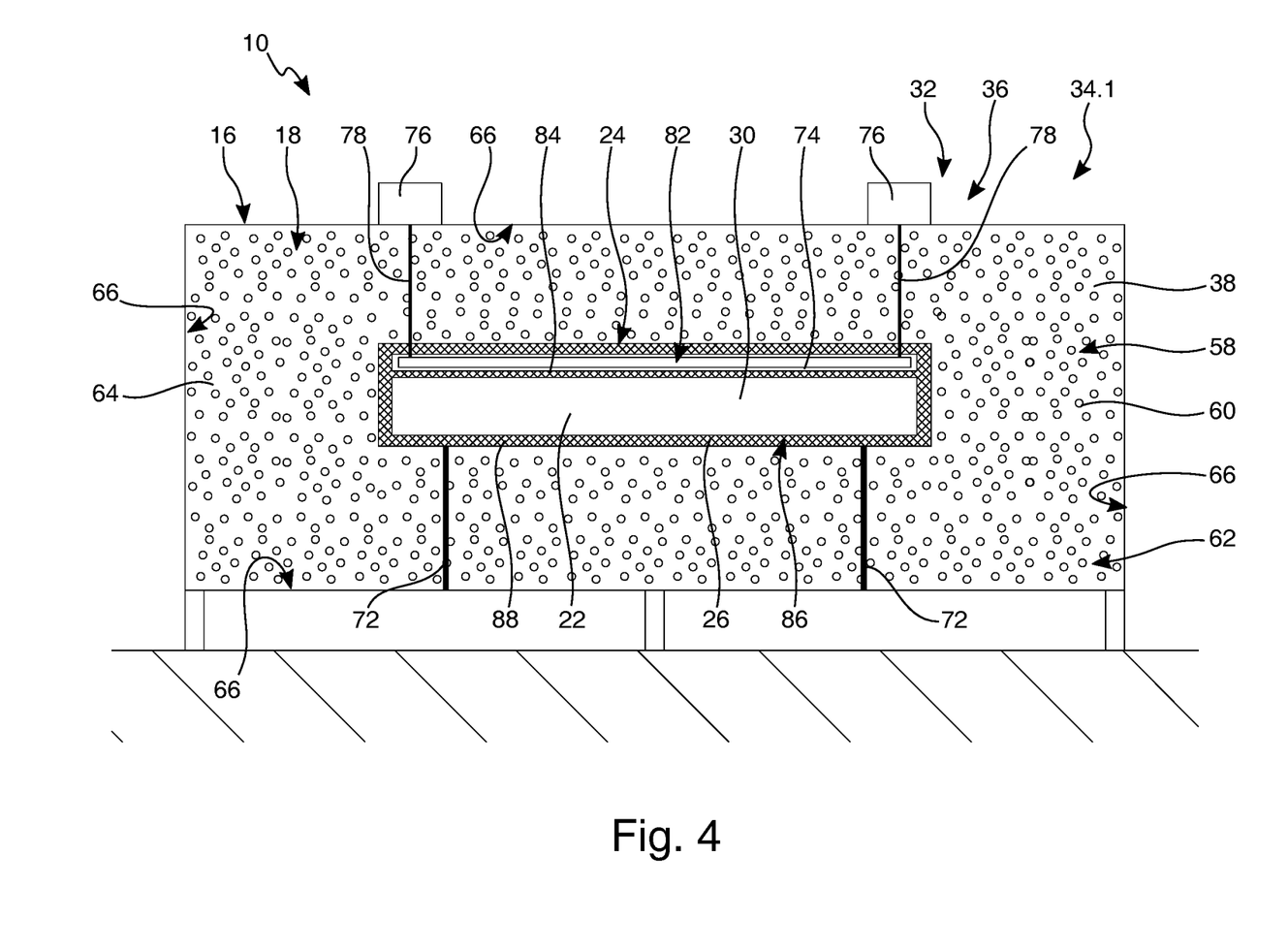
FIG. 4 a corresponding cross section of a second working example of the furnace.

In the second working example of the furnace 10 shown in FIG. 4, the process space 22 is adjoined by a heating space 82 in which the heating element 74 is arranged. The heating space 82 is separated by a dividing wall 84 from the process space 24.

For this purpose, the process space housing 24, i.e. the muffle 26, is configured as multichamber housing 86, in this case a two-chamber housing 88, which delimits firstly the process space 22 and secondly the heating space 82.

In a modification which is not shown individually, the heating space 82 can also be delimited by a dedicated housing which is installed on the process space housing 24.

The heating space 82 is located on the upper side of the process space 22. In a modification which is not shown individually, the heating space 82 with the heating element 74 can also be arranged on the underside of the process space 22.

Figure 5:
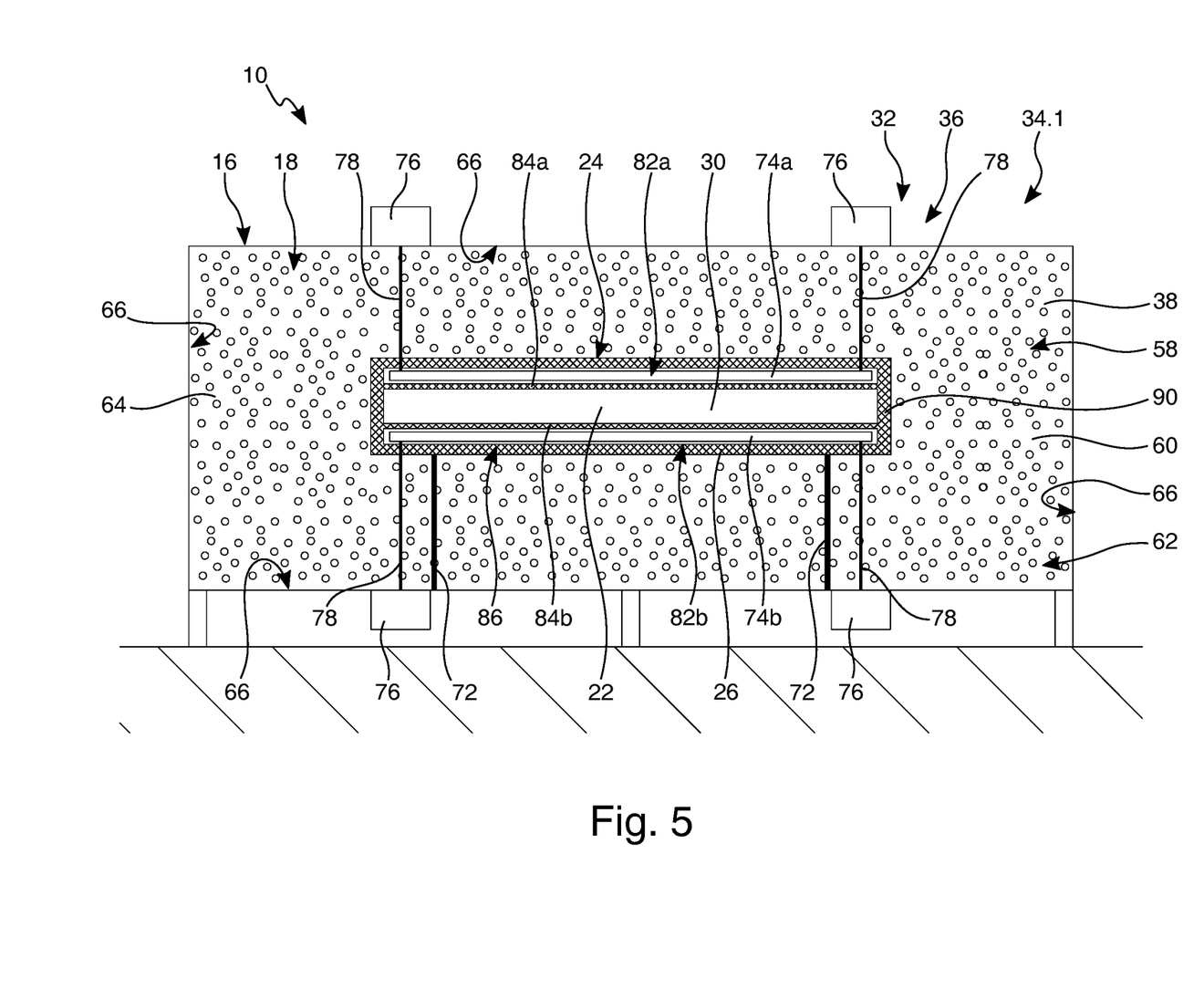
FIG. 5 a corresponding cross section of a third working example of the furnace.

In the third working example of the furnace 10 shown in FIG. 5, the heating space on the upper side of the process space 22 is a first heating space 82a and the heating element accommodated therein is a first heating element 74a. The dividing wall is a first dividing wall 84a. In addition, the process space 22 is adjoined by a second heating space 82b in which a second heating element 74b is arranged. The second heating space 82b is separated from the process space 24 by a second dividing wall 84b.

For this purpose, the process space housing 24, i.e. the muffle 26, is once again configured as a multichamber housing 86, in this case as three-chamber housing 90, which delimits firstly the process space 22 and secondly both the first heating space 82*a* and also the second heating space 82*b*.

In a modification which is not shown individually, the first heating space 82*a* and/or the second heating space 82*b* can correspondingly be delimited in each case by a separate housing which is installed on the process space housing 24.

The second heating space 82*b* is located on the underside of the process space 22.

In modifications which are not shown individually, it is possible, as an alternative or in addition to the heating spaces 82 or 82*a* and 82*b* respectively, for one or more heating spaces to be provided on the side next to the process space 22, in which space or spaces vertically oriented heating elements are then arranged.

In the working examples with the heating space 82 or with the heating spaces 82*a*, 82*b*, it is accordingly not possible for the insulation space 62 or the insulating bed 58 to completely adjoin the process space 22 in the circumferential direction. In the region of the heating spaces 82, 82*a* and 82*b*, these are in each case arranged between the process space 22 and the insulation space 62 and the insulating bed 58.

In a modification which is likewise not shown individually, the furnace 10 can in its entirety or at least in the process space 22 be crossed in the vertical direction by the fibers 12. In this case, the heating elements 74, 74*a* and 74*b* and any associated heating spaces 82, 82*a* and 82*b* are in each case no longer oriented horizontally, but instead vertically.

In a further modification which is not shown individually, the furnace housing 16 can itself further comprise a supplementary thermal insulation.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A furnace for the thermal treatment of fibers, comprising:
   a) a furnace housing;
   b) a process space which is located in an interior space of the furnace housing and is delimited by a process space housing having a process space atmosphere and into which a material to be treated can be introduced, the process space housing comprising an inlet opening formed therein, wherein the material passes through the inlet opening into the process space to be treated;
   c) a heating system having a heating element located inside the process space housing and by means of which a process space atmosphere present in the process space can be heated;
   d) an insulation space existing between an interior side of the furnace housing and an exterior side of the process space housing, the insulation space housing an insulation layer which thermally insulates the process space, the insulation space comprising at least one intermediate wall dividing the insulation space into at least two insulation sections,
   e) a plurality of closable openings formed in an exterior surface of the furnace housing, each closable opening having a respective insulation section accessible therethrough to allow for the insulation layer in the respective insulation section to be supplemented
   wherein
   f) the insulation layer is an insulating bed composed of a solid particulate material that is configured adjacent to the process space housing such that at least a portion of an exterior of the process space housing adjoins the insulation layer and at least a portion of an interior side of the process space housing bounds the process space and process space atmosphere.

2. The furnace as claimed in claim 1, wherein the solid particulate material of the insulating bed has been densified.

3. The furnace as claimed in claim 1, wherein the solid particulate material is a granular material, in the form of a grain-like material, a pulverulent material or a powder material, or has been processed to give a pellet material.

4. The furnace as claimed in claim 1, wherein the solid particulate material is a carbon black material having a carbon content of more than 99.5%.

5. The furnace as claimed in claim 4, wherein the carbon black material is a gas black, a furnace black, a flame black, a carbon black from cracking, an acetylene black, a thermal black, a channel black or a mixture of a plurality of these types of carbon black.

6. The furnace as claimed in claim 1, wherein the insulation space surrounds the process space housing at least in regions.

7. The furnace as claimed in claim 6, wherein the insulation space is configured as an annular space whose outer boundary is formed by corresponding regions of the furnace housing.

8. The furnace as claimed in claim 6, wherein the insulation space adjoins the process space housing at least in regions.

9. The furnace as claimed in claim 1, wherein the heating system comprises at least one heating element which is arranged in the process space.

10. The furnace as claimed in claim 1, wherein the heating system comprises at least one heating element which is arranged in a heating space which adjoins the process space.

11. The furnace as claimed in claim 10, wherein the heating space is arranged on an upper side or on an underside of the process space.

12. The furnace as claimed in claim 10, wherein the at least one heating element is a first heating element and the heating space is a first heating space, where the heating system comprises at least one second heating element which is arranged in a second heating space which adjoins the process space.

13. The furnace as claimed in claim 12, wherein the first heating space is arranged on an upper side of the process space and the second heating space is arranged on an underside of the process space.

14. The furnace as claimed in claim 1, wherein the process space housing is configured as a muffle.

15. The furnace as claimed in claim 10, wherein the process space housing delimits the process space and the heating space.

16. The furnace as claimed in claim 1, wherein the furnace is a continuous furnace and the material to be treated can be passed through the process space.

17. The furnace as claimed in claim 14, wherein the muffle is composed of graphite.

18. The furnace as claimed in claim 1, wherein the solid particulate material is a free-flowing bulk material.

19. The furnace as claimed in claim 1, wherein the insulation layer is further bound by a wall, the wall extending from the interior side of the furnace housing to the exterior side of the process space housing and being positioned flush with a portion of the exterior side of the process space housing defining the inlet opening.

* * * * *